United States Patent
Miyata et al.

(10) Patent No.: US 9,983,357 B2
(45) Date of Patent: May 29, 2018

(54) OPTICAL DEMULTIPLEXER (71) Applicant: KITANIHON ELECTRIC CABLE CO., LTD., Miyagi (JP)

(72) Inventors: Ryusuke Miyata, Miyagi (JP); Junichi Suzuki, Miyagi (JP); Yoshihisa Hirai, Miyagi (JP); Hirotaka Katouno, Miyagi (JP)

(73) Assignee: KITANIHON ELECTRIC CABLE CO., LTD., Miyagi (JP)

( * ) Notice: Subject to any disclaimer, the term of this patent is extended or adjusted under 35 U.S.C. 154(b) by 0 days. days.

(21) Appl. No.: 15/602,943

(22) Filed: May 23, 2017

(65) Prior Publication Data

US 2018/0031768 A1 Feb. 1, 2018

(30) Foreign Application Priority Data

Jul. 29, 2016 (JP) ................................ 2016-149292

(51) Int. Cl.
G02B 6/293 (2006.01)
G02B 6/42 (2006.01)

(52) U.S. Cl.
CPC ....... G02B 6/29367 (2013.01); G02B 6/2938 (2013.01); G02B 6/4208 (2013.01)

(58) Field of Classification Search
CPC .............................................. G02B 6/29367
See application file for complete search history.

(56) References Cited

U.S. PATENT DOCUMENTS

| | | | | |
|---|---|---|---|---|
| 5,583,683 A * | 12/1996 | Scobey | ................. | G02B 5/288 359/587 |
| 6,636,654 B2 * | 10/2003 | McGuire, Jr. | .......... | G02B 6/356 385/129 |
| 6,775,432 B2 * | 8/2004 | Basu | .................. | G02B 6/29307 385/24 |
| 6,870,976 B2 * | 3/2005 | Chen | .................. | G02B 6/29367 264/1.1 |
| 7,260,328 B2 * | 8/2007 | Kropp | ................ | G02B 6/29367 385/47 |
| 8,303,195 B2 * | 11/2012 | Adachi | ................ | G02B 6/4204 385/73 |
| 8,488,244 B1 * | 7/2013 | Li | ....................... | G02B 27/1006 359/618 |
| 8,537,468 B1 | 9/2013 | Wang et al. | | |
| 8,540,437 B2 * | 9/2013 | Lee | ....................... | G02B 6/4215 385/31 |

(Continued)

Primary Examiner — Jerry Rahll
(74) Attorney, Agent, or Firm — Ohlandt, Greeley, Ruggiero & Perle, L.L.P.

(57) ABSTRACT

An optical demultiplexer that separates, for each signal wavelength, signal light a plurality of wavelengths of which is multiplexed, the optical demultiplexer including: an anti-reflection film disposed at on an incident surface of a glass block; filters disposed on an emission surface of the glass block, the filters transmit light of a wavelength predetermined for each signal wavelength included in the signal light and reflect light of a wavelength other than the transmitting wavelength toward the incident surface; and a reflection film disposed on the incident surface of the glass block, wherein processing to reduce reflection of the reflection light into the glass block is applied on an optical path of the reflection light reflected by the filter disposed at an end away from the antireflection film.

9 Claims, 11 Drawing Sheets (56) References Cited

U.S. PATENT DOCUMENTS

| | | | | |
|---|---|---|---|---|
| 8,861,082 B2 * | 10/2014 | Cobb | ................ | G02B 27/0927 |
| | | | | 359/489.08 |
| 8,970,958 B2 * | 3/2015 | Fattal | ................... | G02B 27/106 |
| | | | | 359/618 |
| 9,285,544 B2 * | 3/2016 | Panotopoulos | ...... | G02B 6/4231 |
| 9,350,454 B2 * | 5/2016 | Xu | ....................... | G02B 6/4215 |
| 9,485,046 B1 * | 11/2016 | Tang | ....................... | H04J 14/02 |

* cited by examiner

OPTICAL DEMULTIPLEXER

BACKGROUND

1. Field of the Disclosure

The present disclosure relates to an optical demultiplexer.

2. Discussion of the Background Art

In optical communication systems, optical demultiplexers that output each wavelength from signal light wavelengths of which are multiplexed are used (e.g. see Patent Literature 1). In the optical demultiplexer of Patent Literature 1, light subjected to multiple reflection by a multiple reflector is separated by a plurality of filters having different transmission bands. By receiving this separated light by a light-receiving element, signal light wavelengths of which are multiplexed is received.

CITATION LIST

Patent Literature

Patent Literature 1: U.S. Pat. No. 8,537,468

SUMMARY

Technical Problem

In optical communication systems, downsizing and a higher accuracy of optical demultiplexers are desired. However, downsizing of a multiple reflector to a desired size causes a problem that wavelength characteristics are deteriorated. Therefore, an object of the present disclosure is to achieve both of downsizing and a higher accuracy of an optical demultiplexer.

Solution to Problem

The present inventors have analyzed a cause of deterioration of wavelength characteristics and, as a result of this, have found that reflection on a side surface of a multiple reflector causes stray light. The present disclosure therefore prevents signal light from entering a side surface of a multiple reflector.

Specifically, an optical demultiplexer according to the present disclosure is, an optical demultiplexer that separates, for each signal wavelength, signal light a plurality of wavelengths of which is multiplexed, the optical demultiplexer including:

an antireflection film disposed at a portion of a first surface of a glass block where the signal light enters;

a filter disposed on a second surface of the glass block opposite to the first surface, the filter transmitting light of a wavelength predetermined for each signal wavelength included in the signal light and reflecting light of a wavelength other than the transmitting wavelength toward the first surface; and a reflection film disposed on the first surface of the glass block, the reflection film reflecting the light reflected by the filter toward the second surface of the glass block, wherein processing to reduce reflection of the reflection light into the glass block is applied on an optical path of the reflection light reflected by the filter disposed at an end away from the antireflection film.

According to the present disclosure, downsizing and a higher accuracy of an optical demultiplexer can be both achieved.

DETAILED DESCRIPTION OF THE PREFERRED EMBODIMENT

Embodiments of the present disclosure will be described below in detail with reference to the drawings. Note that the present disclosure is not limited to the embodiments described below. These embodiments are merely examples and the present disclosure may be implemented in a mode applied with various modifications or improvements based on knowledge of a person skilled in the art. Note that components having the same symbol in the present description and the drawings represent items identical to each other.

Figure 1:
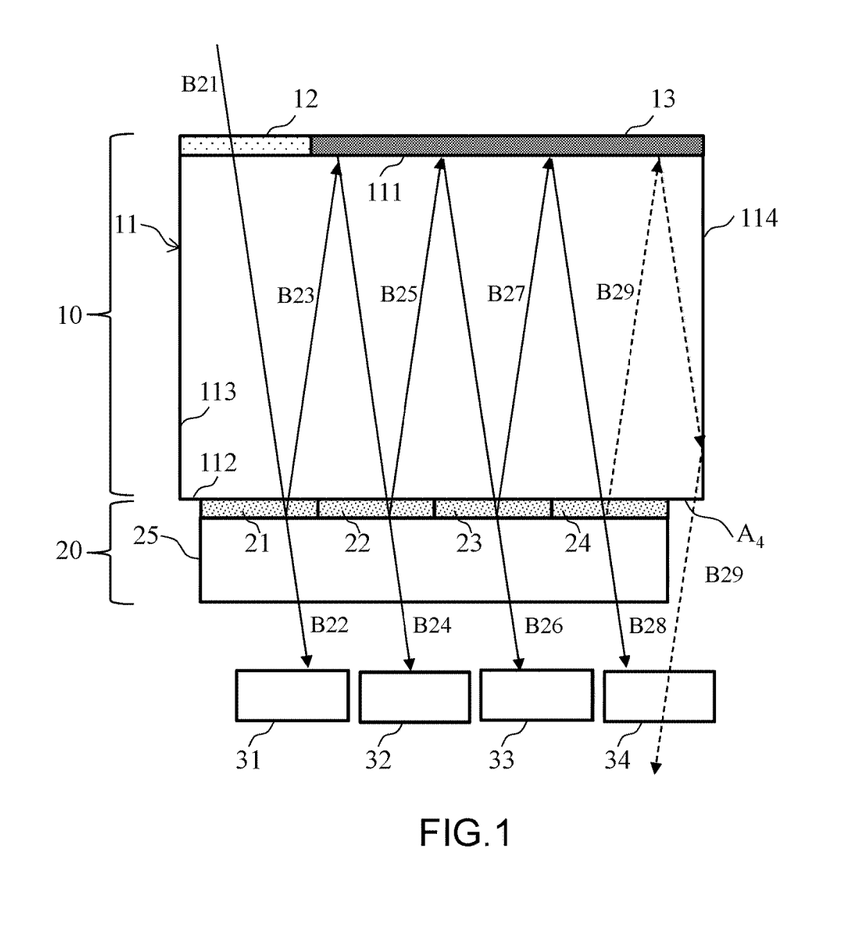
FIG. 1 illustrates a configuration of an optical demultiplexer of Patent Literature 1.

FIG. 1 illustrates an example of a configuration of an optical demultiplexer related to the present disclosure. The related optical demultiplexer includes a multiple reflector 10 and a filter unit 20 and separates, for each channel, signal light B21 wavelengths of a plurality of channels of which is multiplexed. The number of channels may be any number and in the present disclosure, a case of four channels will be described as an example.

The multiple reflector 10 is disposed with an antireflection film 12 and a reflection film 13 on an incident surface 111 of a glass block 11 thereof. The filter unit 20 is disposed on an emission surface 112 side of the glass block 11 opposite to the incident surface 111 of the glass block 11. The multiple reflector 10 and the filter unit 20 are integrated by bonding by UV curing resin or other materials.

The filter unit 20 is formed with filters 21 to 24 on a glass block 25 thereof. The filters 21 to 24 transmit signal light having a wavelength predetermined for each channel and reflects light having a wavelength other than the transmitting wavelength to the incident surface 111. The filters 21 to 24 each have transmission characteristics different from one another and separate signal light into four rays of light.

The antireflection film 12 is disposed at a portion of the incident surface 111 where the signal light B21 enters. The signal light B21 entered from the antireflection film 12 is transmitted by the glass block 11 and enters the filter 21. The filter 21 transmits signal light B22 of a first channel included in the signal light B21. As a result of this, a light-receiving element 31 receives the signal light B22 of the first channel and converts the light into an electric signal.

The filter 21 reflects reflection light B23 other than the signal light B22 of the first channel included in the signal light B21. The reflection light B23 is reflected by the reflection film 13 and then enters the filter 22. The filter 22 transmits signal light B24 of a second channel included in the reflection light B23. As a result of this, a light-receiving element 32 receives the signal light B24 of the second channel and converts the light into an electric signal.

Similarly to the signal light B24 of the second channel, signal light B26 of a third channel is received by a light-receiving element 33 and signal light B28 of a fourth channel is received by a light-receiving element 34. In this manner, the reflection film 13 causes multiple reflection in the glass block 11.

The present inventors have performed optical path analysis and found out that reflection light B29 reflected by the filter 24 disposed at an end away from the antireflection film 12 is reflected by the reflection film 13, then reflected on a side surface 114 or other surfaces of the glass block 11, passes a region $A_4$ of the filter unit 20 where the filters 21 to 24 are not disposed, and then enters the light-receiving element 34. This optical component forms stray light that is unnecessary to the optical demultiplexer, thereby causing deterioration of wavelength characteristics. Such stray light may sometimes cause malfunction of the optical demultiplexer and/or deteriorate reliability of signal control. It is also found out that the stray light component described above has different intensities upon entering the light-receiving element 34 depending on a position where the signal light B21 enters the antireflection film 12. In the optical demultiplexer according to an embodiment, therefore, an optical path of the reflection light B29 reflected by the filter 24 in the reflection film 13 is applied with processing to reduce reflection of the reflection light B29 into the glass block 11.

Figure 2:
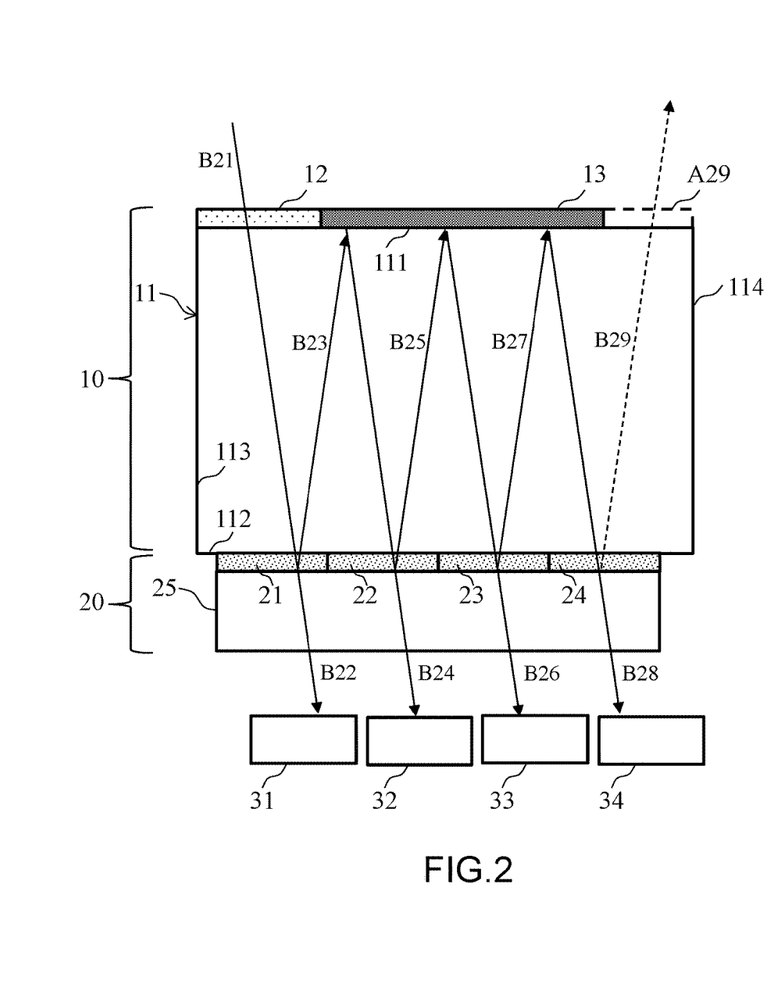
FIG. 2 illustrates a first configuration example of an optical demultiplexer according to an embodiment.
Figure 3:
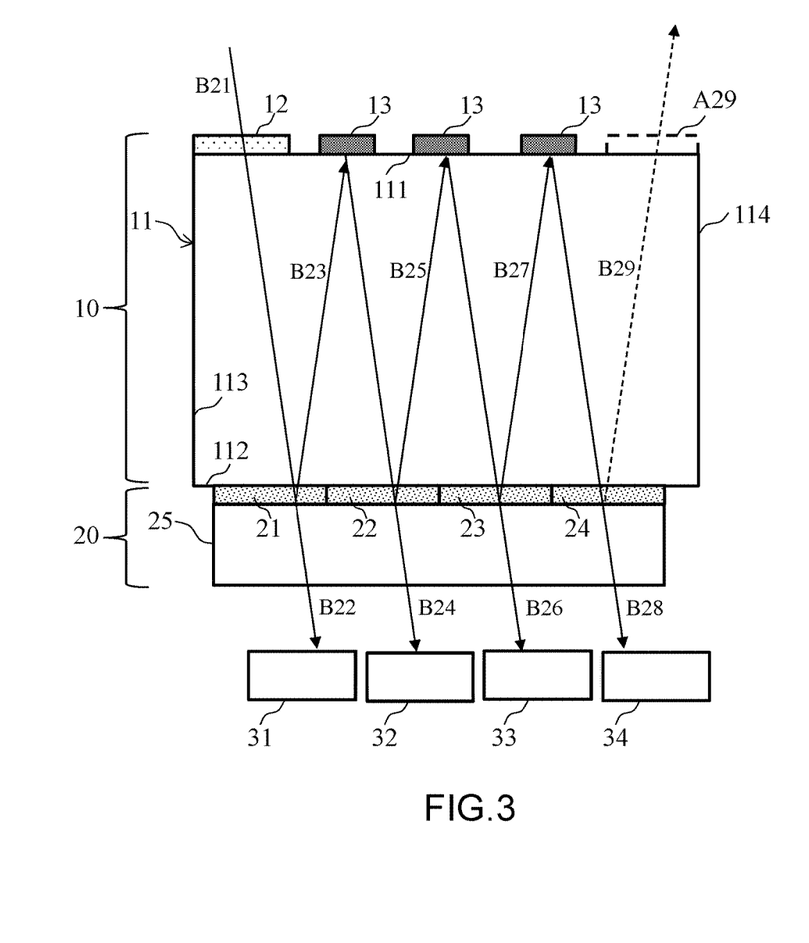
FIG. 3 illustrates a second configuration example of an optical demultiplexer according to an embodiment.

FIGS. 2 and 3 illustrate a first and a second configuration examples of an optical demultiplexer according to the present embodiment. A region where a reflection film 13 is disposed is limited to optical paths of reflection light B23, B25, and B27 while the reflection film 13 is not disposed in a region A29 which may form an optical path of reflection light B29. This allows for reducing reflection of the reflection light B29 into a glass block 11 as compared to the case where the reflection film 13 is disposed thereat.

The reflection film 13 may be disposed in a continued manner as illustrated in FIG. 2 when disposed in a limited manner only on the optical paths of the reflection light B23, B25, and B27 to be reflected; however, the reflection film 13 may be disposed discretely as illustrated in FIG. 3.

Figure 4:
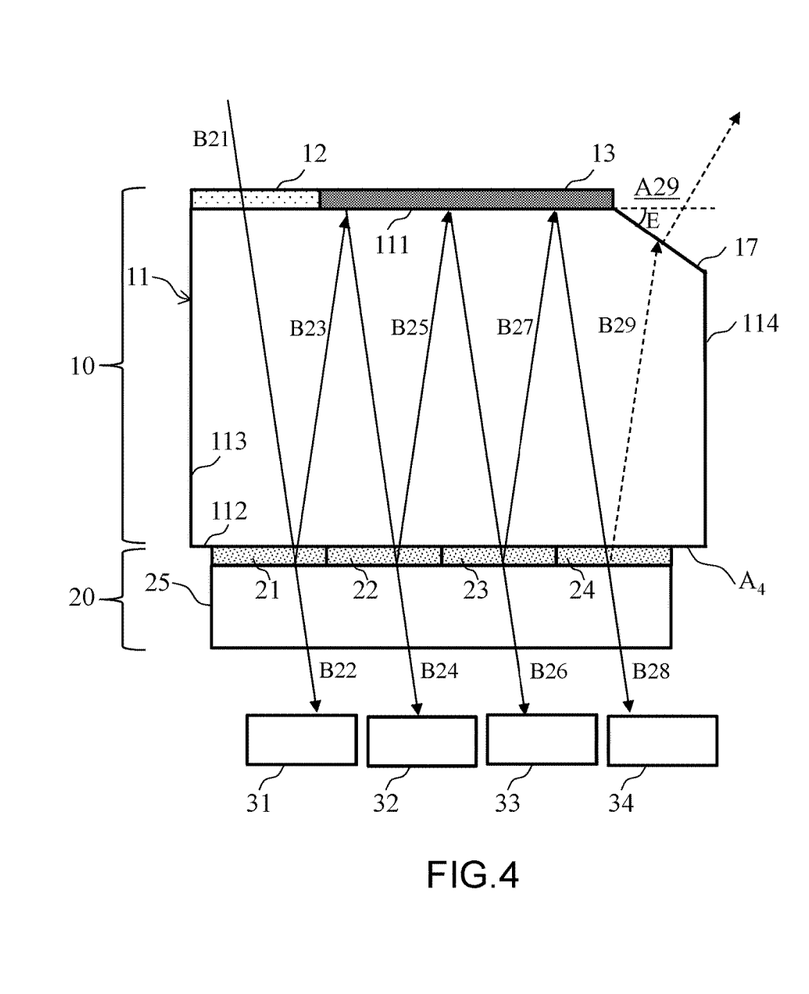
FIG. 4 illustrates a third configuration example of an optical demultiplexer according to an embodiment.

FIG. 4 illustrates a third configuration example of an optical demultiplexer according to the present embodiment. The third configuration example of the optical demultiplexer preferably includes a cut-off portion 17 inclined with respect to an incident surface 111 at an angle E on an optical path of reflection light B29 on the incident surface 111. The angle E of the cut-off portion 17 is larger than an incident angle of the reflection light B29 on the incident surface 111. This allows for preventing the reflection light B29 from entering a light-receiving element 34 even when a part of the reflection light B29 is reflected by the cut-off portion 17. Arrangement example of the reflection film 13 may be discrete as illustrated in FIG. 3.

Figure 5:
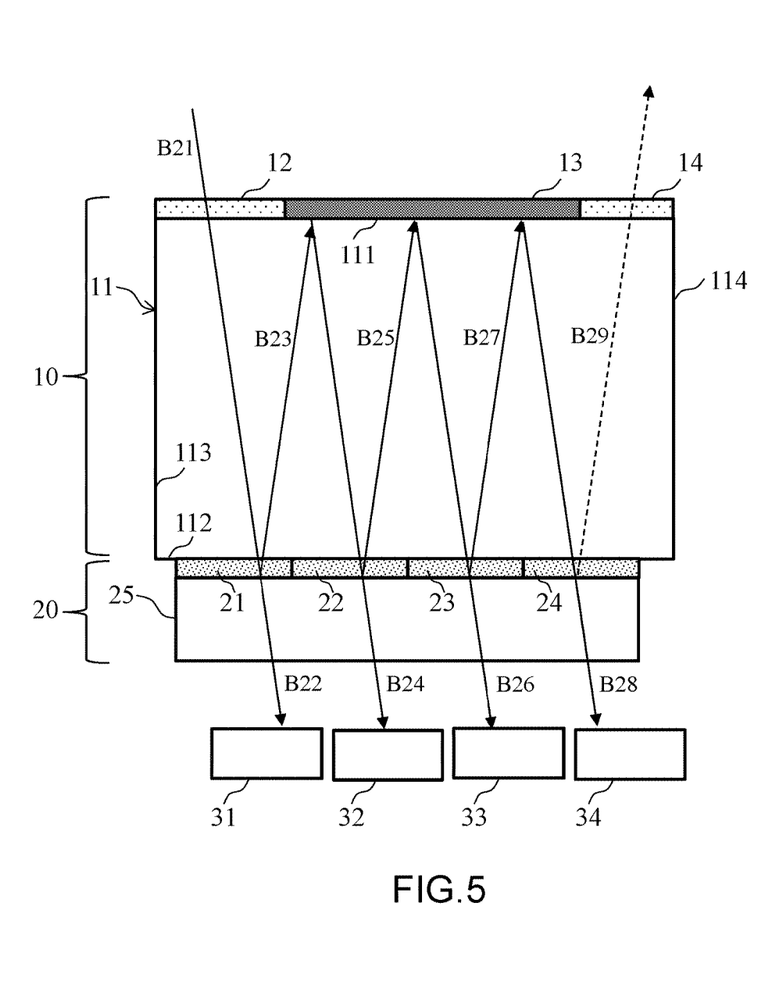
FIG. 5 illustrates a fourth configuration example of an optical demultiplexer according to an embodiment.
Figure 6:
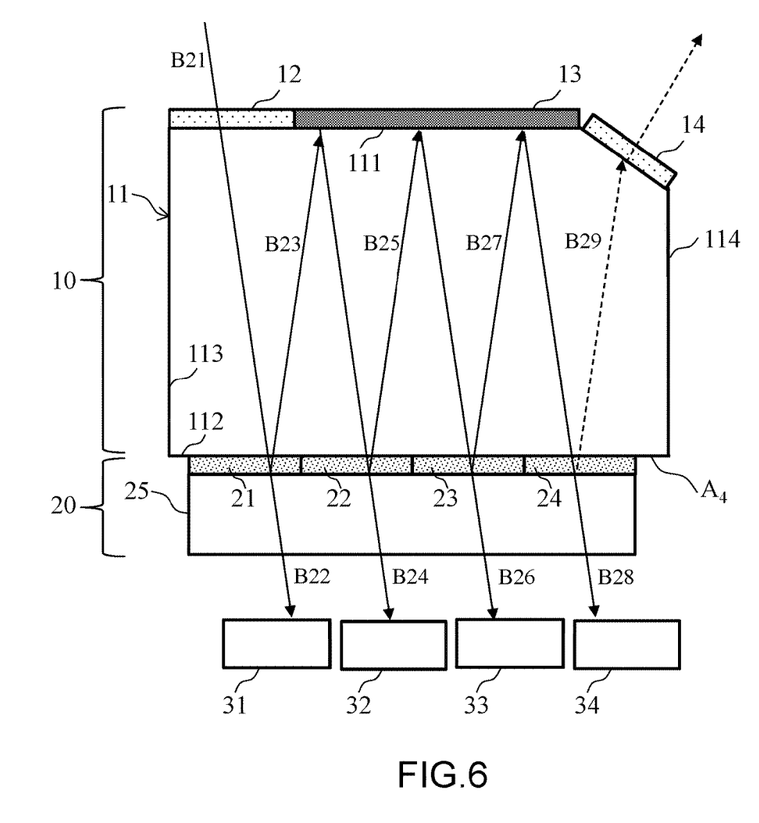
FIG. 6 illustrates a fifth configuration example of an optical demultiplexer according to an embodiment.

FIG. 5 illustrates a fourth configuration example of an optical demultiplexer according to the present embodiment. In the fourth configuration example of the optical demultiplexer, a region A29 that may form an optical path of reflection light B29 is provided with an antireflection film 14 that reduces reflection with respect to signal light B21. Disposing the antireflection film 14 in the region A29 allows for preventing reflection by an incident surface 111 of a glass block 11. As the antireflection film 14, any thin film that mitigates a differential refractive index of the incident surface 111 of the glass block 11 may be used. Arrangement example of the reflection film 13 may be discrete as illustrated in FIG. 3. It is further preferable that the antireflection film 14 is provided to a cut-off portion 17 as illustrated in FIG. 6.

The antireflection film 14 may be directly formed on the glass block 11, for example. Alternatively, the antireflection film 14 may be formed on a glass substrate having a refractive index equivalent to that of the glass block 11 and thereafter the processed substrate may be disposed on the glass block 11 such that the glass block 11 and glass of the processed substrate are in contact with each other.

The antireflection film 14 preferably has the same composition as that of the antireflection film 12. This allows downsizing and a higher accuracy of the optical demultiplexer to be both achieved without increasing the number of manufacturing processes since the antireflection film 14 and the antireflection film 12 can be formed in a common process.

The antireflection film 14 illustrated in FIG. 5 may be an absorbing film having an optical absorption property with respect to the signal light B21. Disposing the absorbing film instead of the antireflection film 14 allows for reducing reflection by an incident surface 111 of a glass block 11. The absorbing film may be disposed at any position in the optical path of the reflection light B29 as illustrated in FIG. 1 that is propagated in the glass block 11. Arrangement example of the reflection film 13 may be discrete as illustrated in FIG. 3. It is further preferable that the absorbing film is provided to the cut-off portion 17 as illustrated in FIG. 6.

Figure 7:
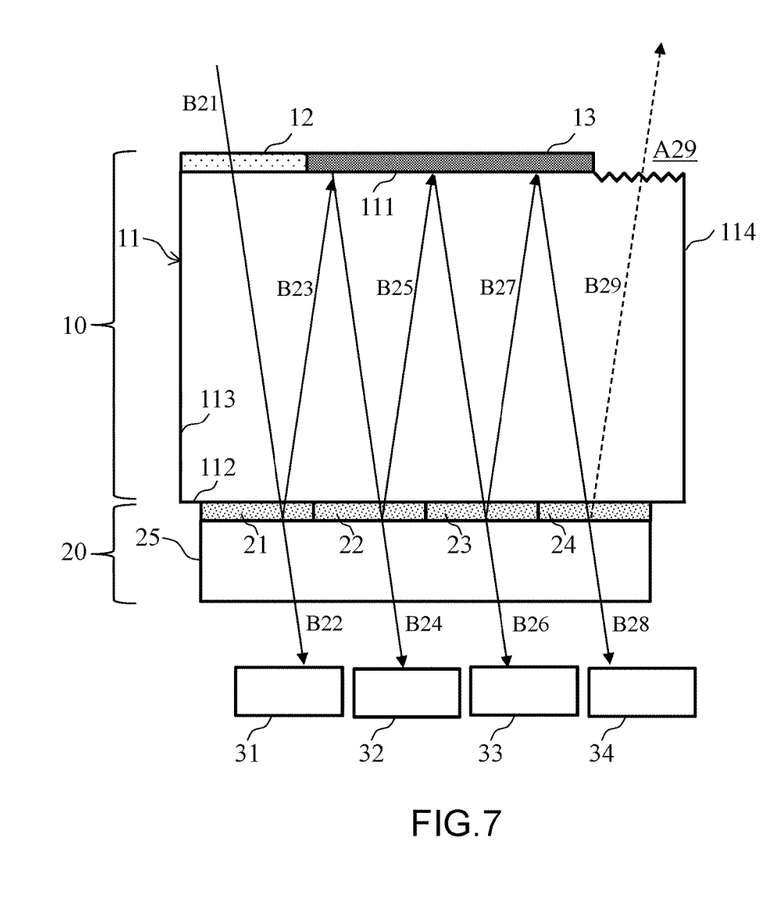
FIG. 7 illustrates a sixth configuration example of an optical demultiplexer according to an embodiment.
Figure 8:
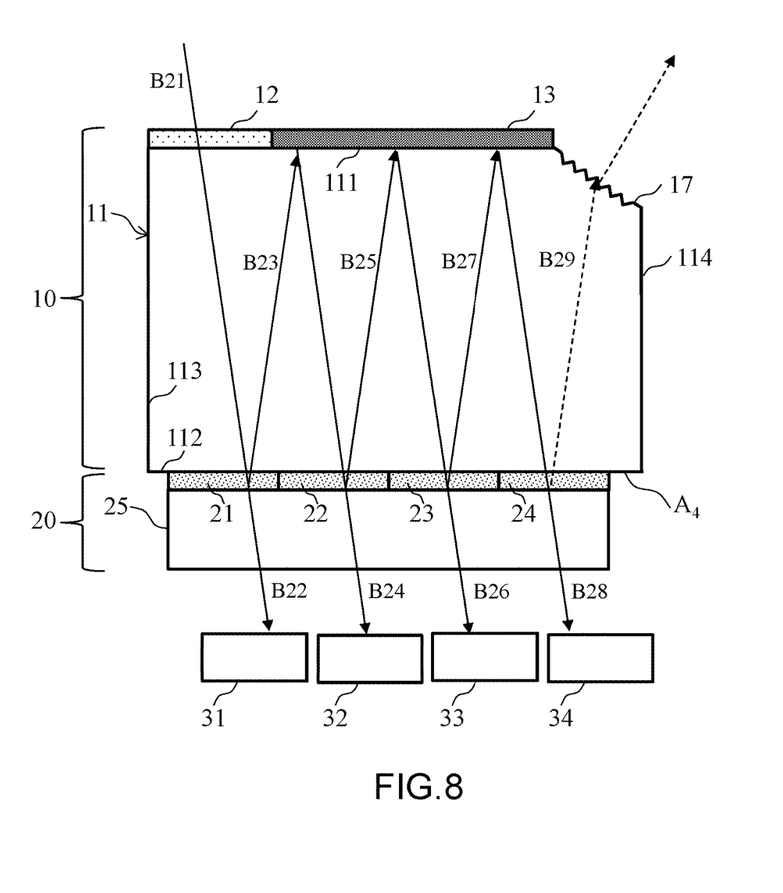
FIG. 8 illustrates a seventh configuration example of an optical demultiplexer according to an embodiment.

FIG. 7 illustrates a sixth configuration example of an optical demultiplexer according to the present embodiment. In the sixth configuration example of the optical demultiplexer, a region A29 of a glass block 11 that may form an optical path of reflection light B29 is formed into a fine uneven shape. As a result of this, the reflection light B29 is diffused on an end surface of the glass block 11 in the region A29, thereby reducing light to a side surface 114 that may enter a light-receiving element 34. Arrangement example of the reflection film 13 may be discrete as illustrated in FIG. 3. It is further preferable that the fine uneven shape is included to a cut-off portion 17 as illustrated in FIG. 8.

Figure 9:
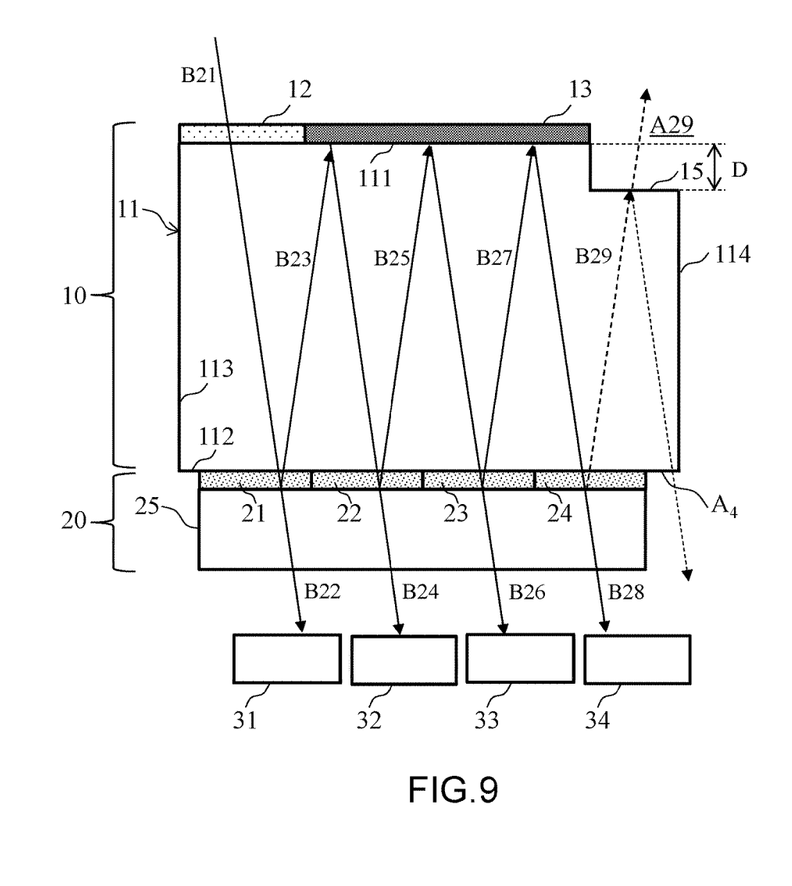
FIG. 9 illustrates an eighth configuration example of an optical demultiplexer according to an embodiment.

FIG. 9 illustrates an eighth configuration example of an optical demultiplexer according to the present embodiment. In the eighth configuration example of the optical demultiplexer, a cut-off portion 15 is included in a glass block 11 on an optical path of reflection light B29. A depth D of the cut-off portion 15 is a depth that leads the reflection light B29 reflected by an incident surface 111 to a region $A_4$ on the emission surface 112 where a filter 24 is not disposed. This allows for preventing the reflection light B29 toward a light-receiving element 34 even when a part of the reflection light B29 is reflected by the region $A_4$.

Figure 10:
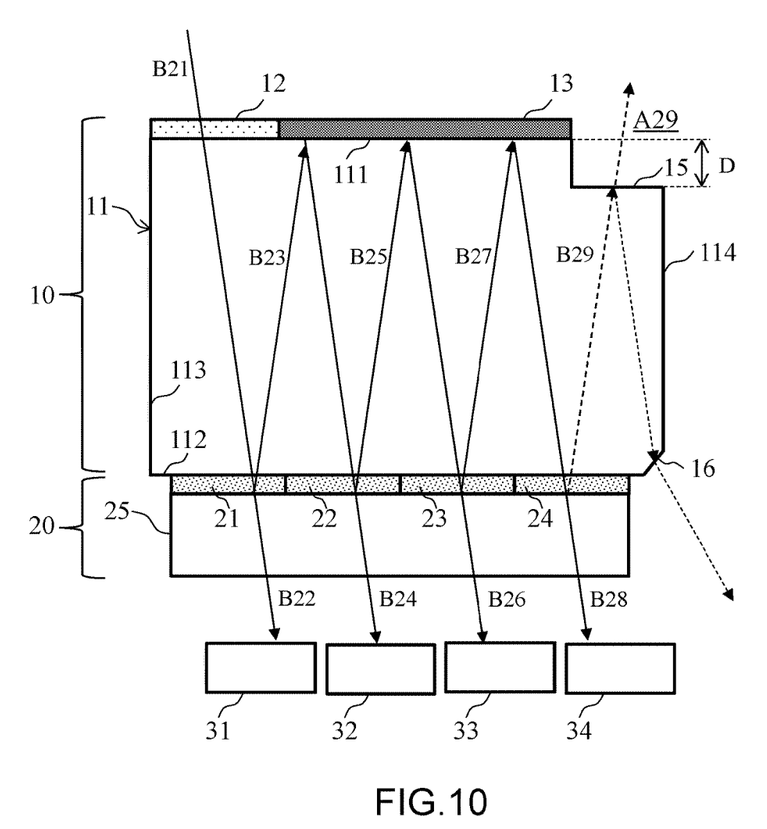
FIG. 10 illustrates a ninth configuration example of an optical demultiplexer according to an embodiment.

FIG. 10 illustrates a ninth configuration example of an optical demultiplexer according to the present embodiment. In the ninth configuration example of the optical demultiplexer, a region $A_4$ of a glass block 11 further includes a cut-off portion 16 such that, in the eighth configuration example of the optical demultiplexer illustrated in FIG. 9, the reflection light B29 emitted from the region $A_4$ is not refracted toward the light-receiving element 34.

Figure 11:
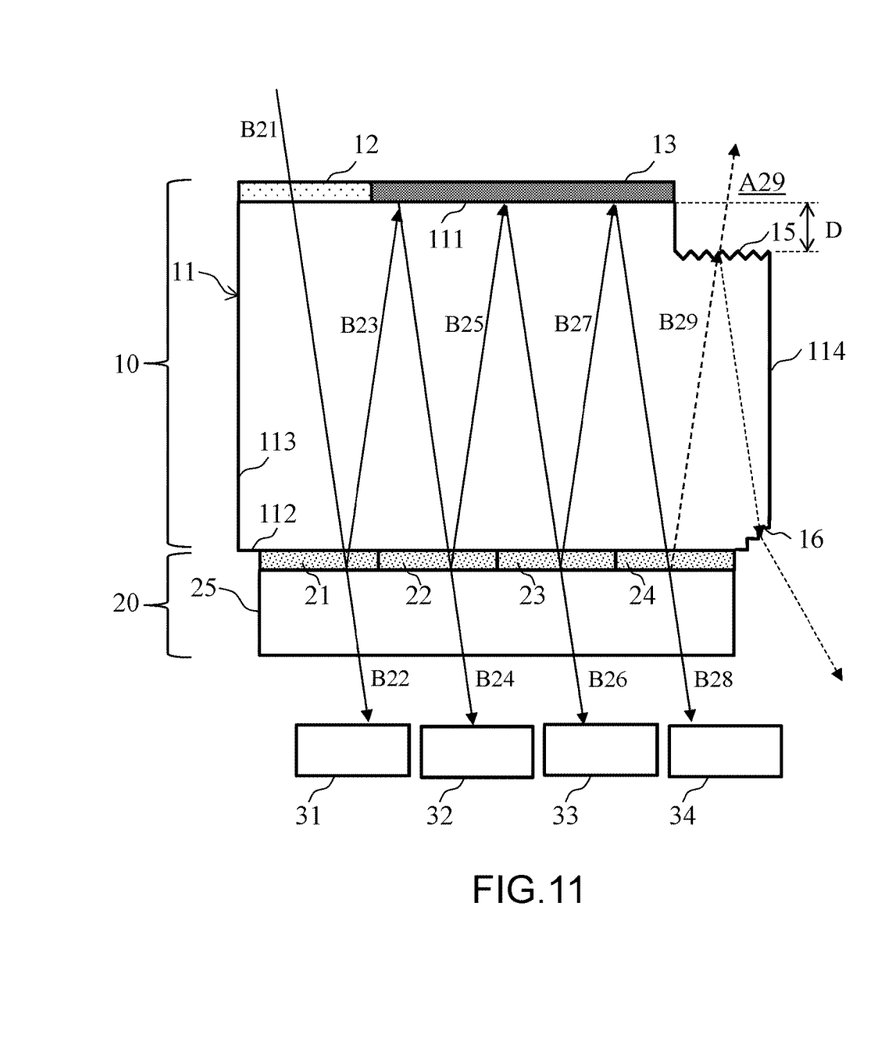
FIG. 11 illustrates a tenth configuration example of an optical demultiplexer according to an embodiment.

FIG. 11 illustrates a tenth configuration example of an optical demultiplexer according to the present embodiment. In the tenth configuration example of the optical demultiplexer, the cut-off portions 15 and 16 of the ninth configuration example of the optical demultiplexer illustrated in FIG. 10 are formed with a fine uneven shape.

As described above, the optical path of the reflection light B29 is applied with processing to reduce reflection of the reflection light B29 into the glass block 11 in the optical demultiplexer according to the present embodiment and thus the reflection light B29 which is residual light after separation by the filters 21 to 24 can be prevented from entering the light-receiving element 34. As a result of this, the optical demultiplexer according to the present embodiment allows for both of downsizing and a higher accuracy of the optical demultiplexer.

Note that in the present embodiment, the case where the four filters 21 to 24 are included and the number of channels included in the signal light B21 is equivalent to the number of filters has been described. However, the number of filters 21 to 24 may be any number of channels included in the signal light B21. For example, when the number of channels included in the signal light B21 is sixteen, wavelengths transmitted by the filters 21 to 24 may be of wavelengths of any channels of the sixteen channels.

INDUSTRIAL APPLICABILITY

The present disclosure is applicable to the high-speed optical communication industry.

REFERENCE SIGNS LIST

10: multiple reflector
11: glass block
111: incident surface
112: emission surface
113, 114: side surface
12, 14: antireflection film
13: reflection film
15, 16, 17: cut-off portion
20: filter unit
21, 22, 23, 24: filter
31, 32, 33, 34: light-receiving element

What is claimed is:

1. An optical demultiplexer that separates, for each signal wavelength, signal light having a plurality of wavelengths which is multiplexed, the optical demultiplexer comprising:
an antireflection film disposed at a first portion of a first surface of a glass block where the signal light enters;
a plurality of filters disposed on a second surface of the glass block opposite to the first surface, wherein each of the plurality of filters transmits light of a wavelength predetermined for each signal wavelength included in the signal light, and wherein each of the plurality of filters reflects light of a wavelength other than the transmitting wavelength toward the first surface; and
a reflection film disposed at a second portion of the first surface of the glass block, wherein the reflection film reflects the light of a wavelength other than the transmitting wavelength reflected by the filter toward the first surface back toward the second surface of the glass block,
wherein light not transmitted by any of the plurality of filters and reflected toward the first surface is processed to reduce reflection thereof into the glass block, and wherein the processing is applied to an optical path of the light not transmitted by any of the plurality of filters.

2. The optical demultiplexer according to claim 1, wherein the processing is performed by an antireflection film disposed in the optical path of the light not transmitted by any of the plurality of filters.

3. The optical demultiplexer according to claim 1, wherein the processing is performed by an absorbing film disposed in the optical path of the light not transmitted by any of the plurality of filters.

4. The optical demultiplexer according to claim 1, wherein the processing is performed by a fine uneven shape disposed in the optical path of the light not transmitted by any of the plurality of filters.

5. The optical demultiplexer according to claim 1, wherein the processing is performed by a first cut-off portion disposed in the optical path of the light not transmitted by any of the plurality of filters, wherein the cut-off portion has an angle with respect to the first surface larger than an incident angle of the light not transmitted by any of the plurality of filters.

6. The optical demultiplexer according to claim 1, wherein the processing is further performed by a second cut-off portion, wherein the second cut-off portion is disposed in the optical path of any of the light not transmitted by any of the plurality of filters that is reflected from the first surface back toward the second surface, and wherein the second cut-off portion is disposed in a region of the second surface where the plurality of filters is not disposed.

7. The optical demultiplexer according to claim 2, wherein the processing is further performed by a third cut-off portion disposed in the optical path of the light not transmitted by any of the plurality of filters, wherein the cut-off portion has an angle with respect to the first surface larger than an incident angle of the light not transmitted by any of the plurality of filters.

8. The optical demultiplexer according to claim 3, wherein the processing is further performed by a third cut-off portion disposed in the optical path of the light not transmitted by any of the plurality of filters, wherein the cut-off portion has an angle with respect to the first surface larger than an incident angle of the light not transmitted by any of the plurality of filters.

9. The optical demultiplexer according to claim 4, wherein the processing is further performed by a third cut-off portion disposed in the optical path of the light not transmitted by any of the plurality of filters, wherein the cut-off portion has an angle with respect to the first surface larger than an incident angle of the light not transmitted by any of the plurality of filters.

* * * * *